Nov. 27, 1934.  R. M. SANDERS  1,982,454
ASSEMBLING MACHINE
Filed Aug. 22, 1931  10 Sheets-Sheet 1
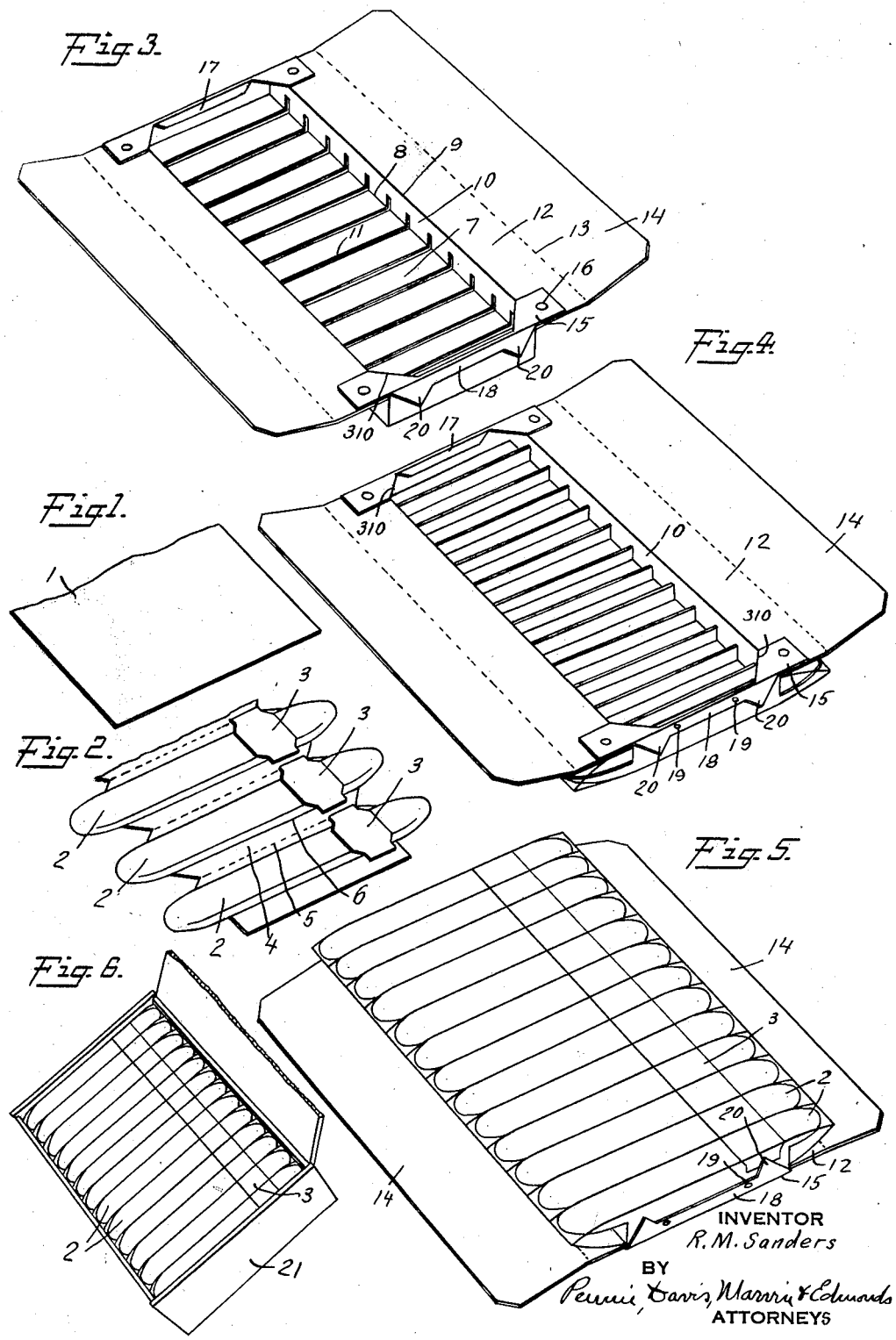

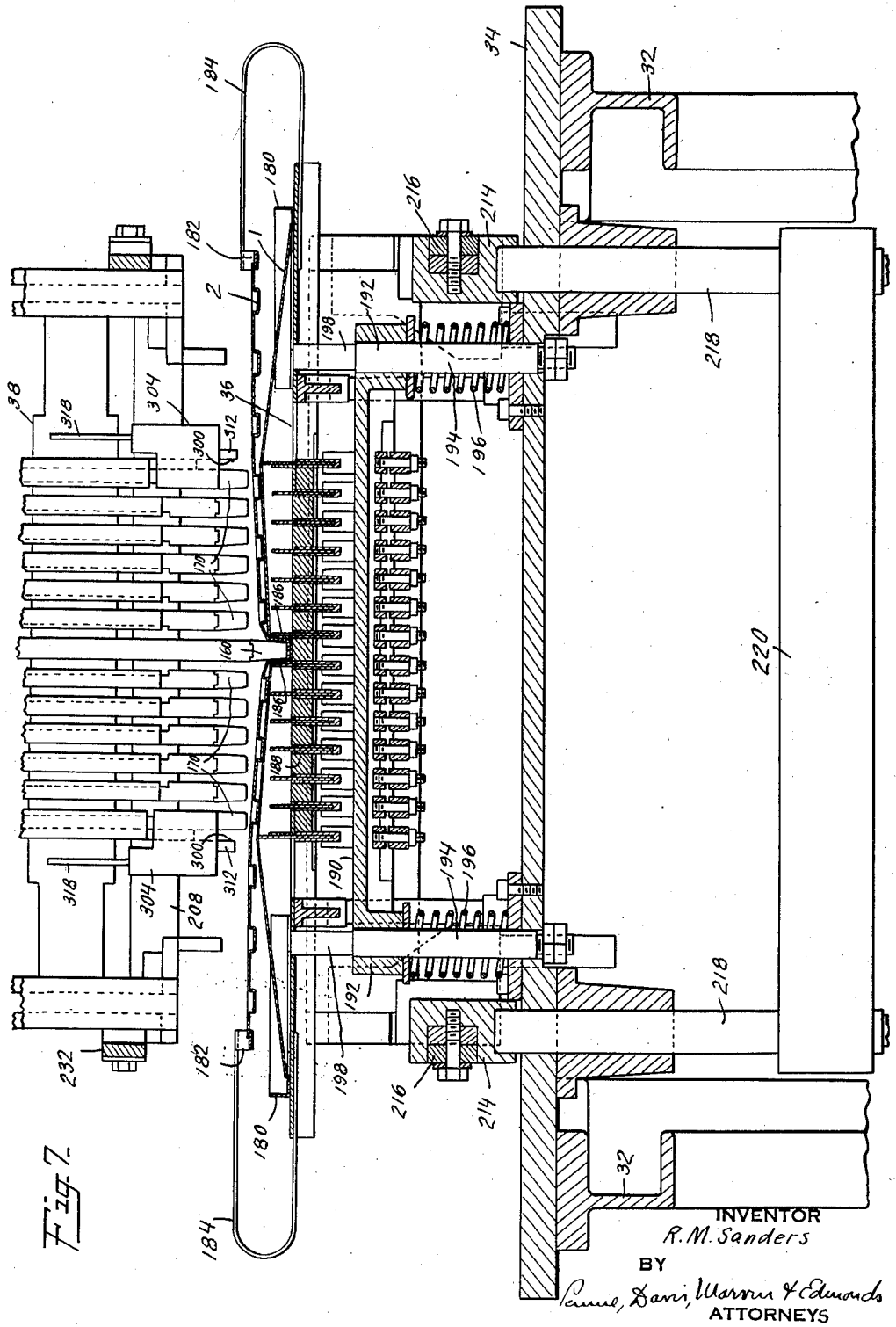

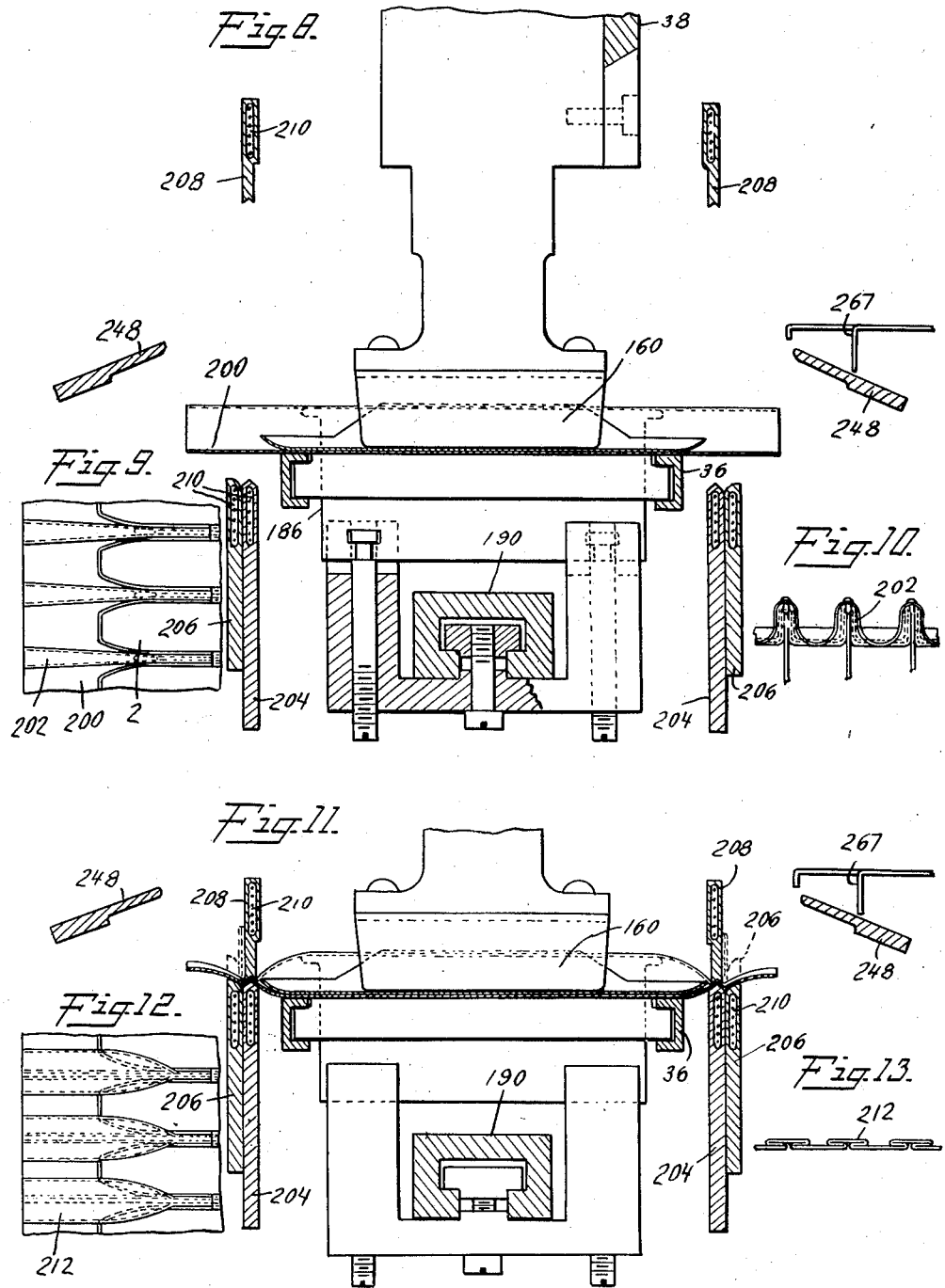

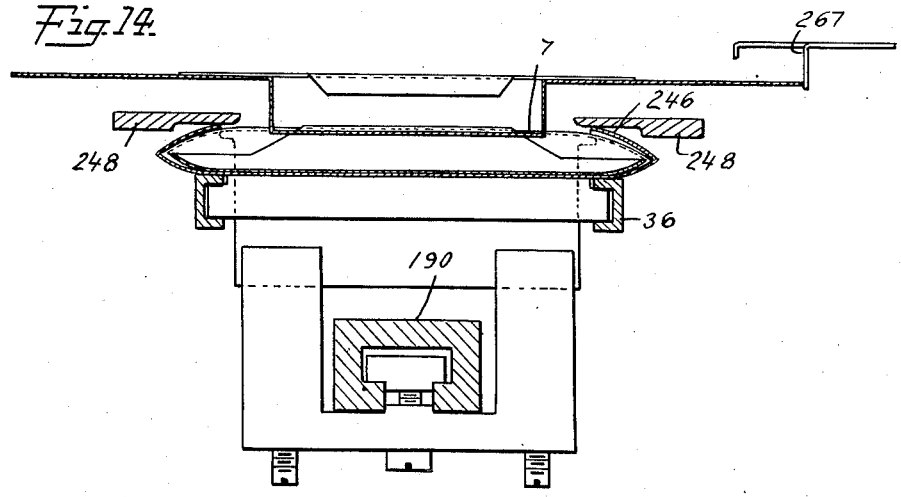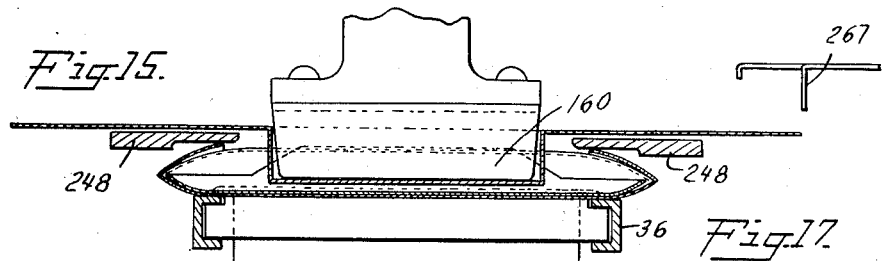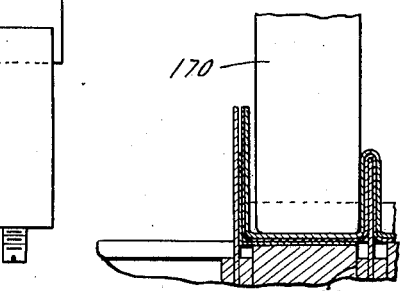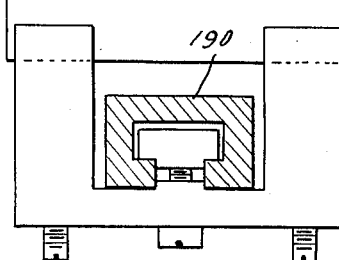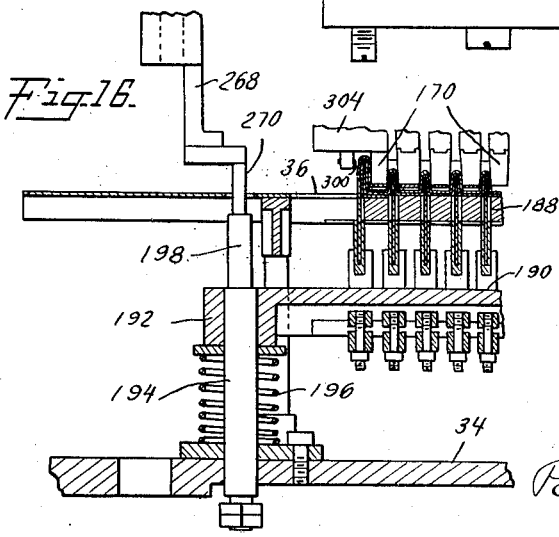

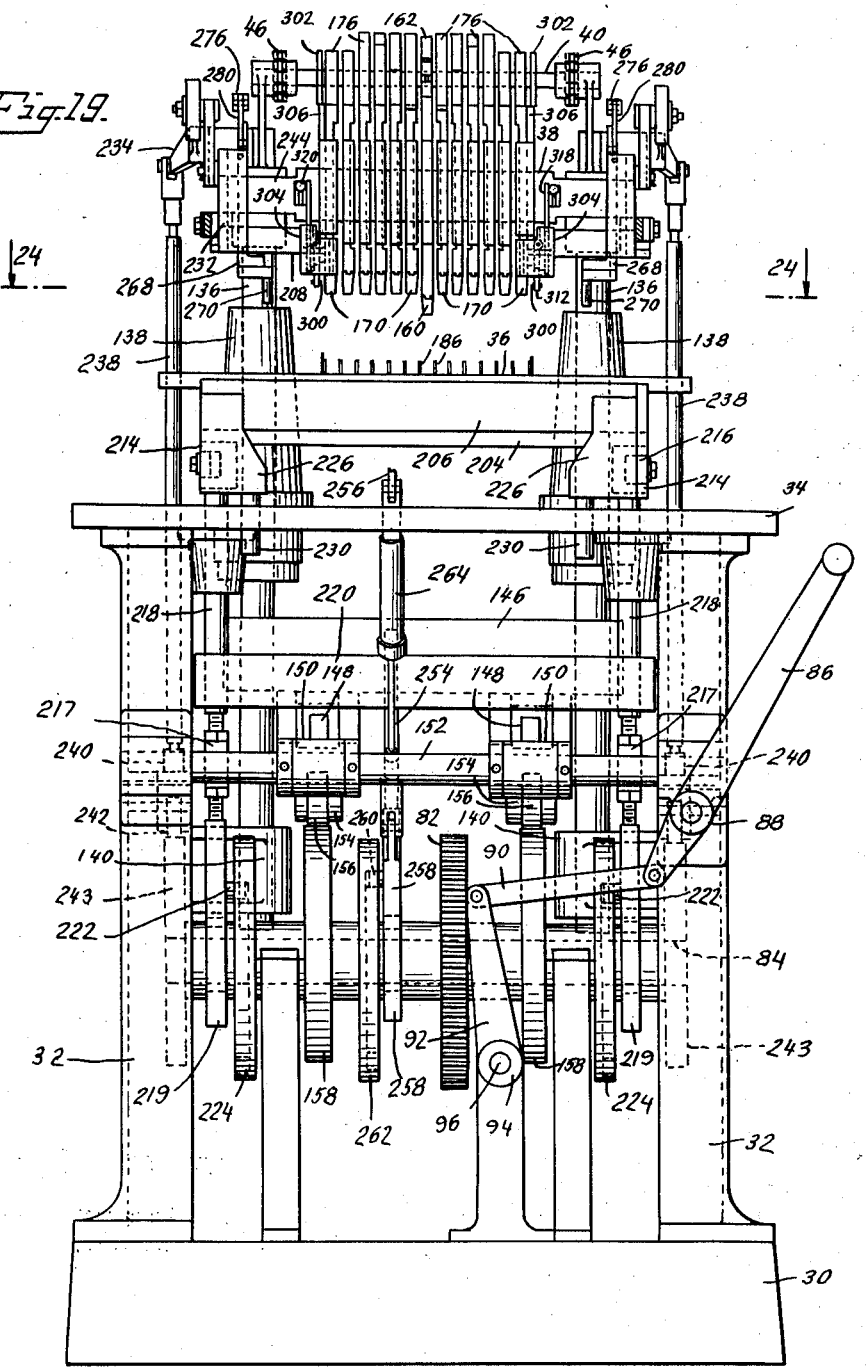

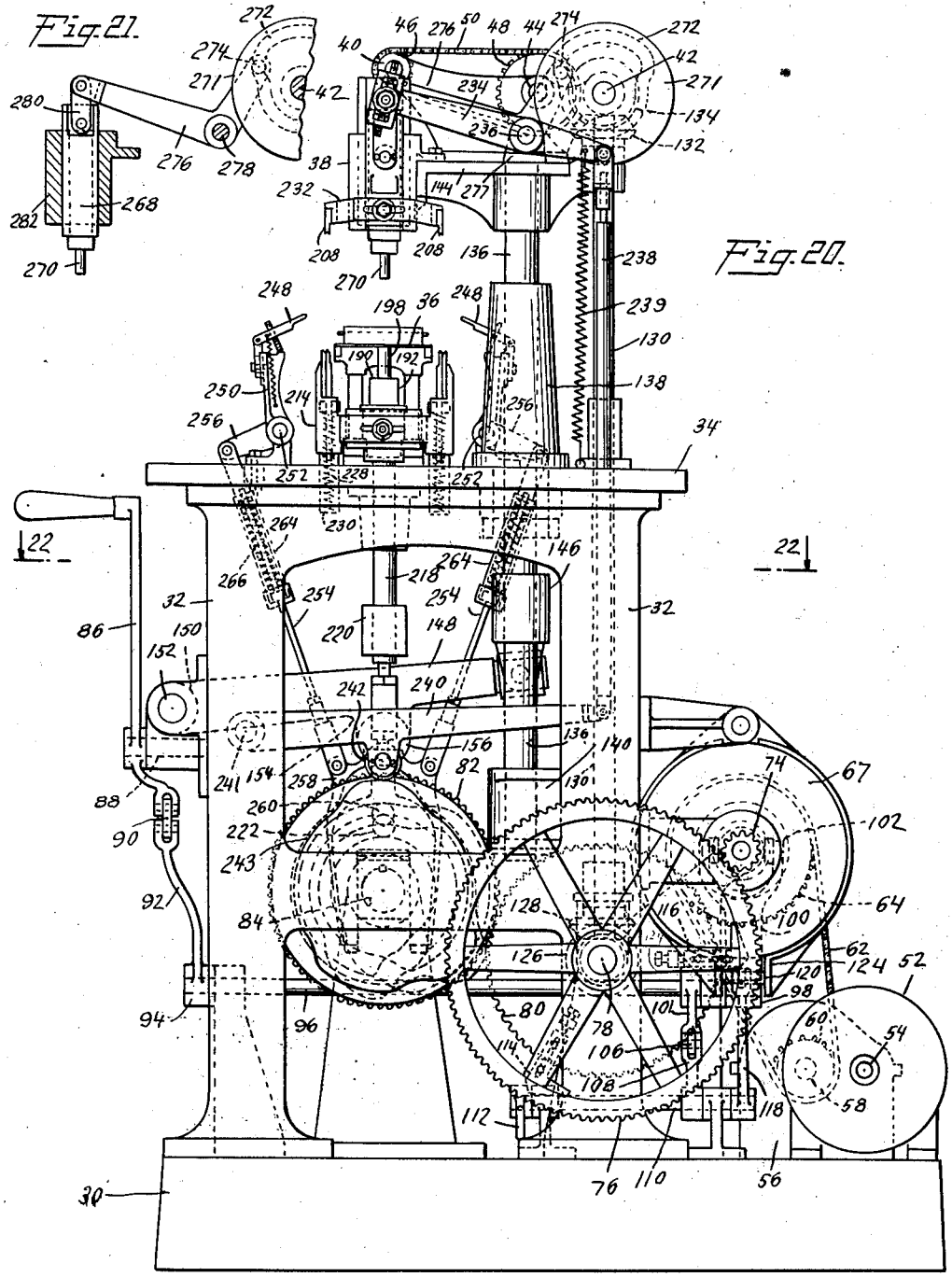

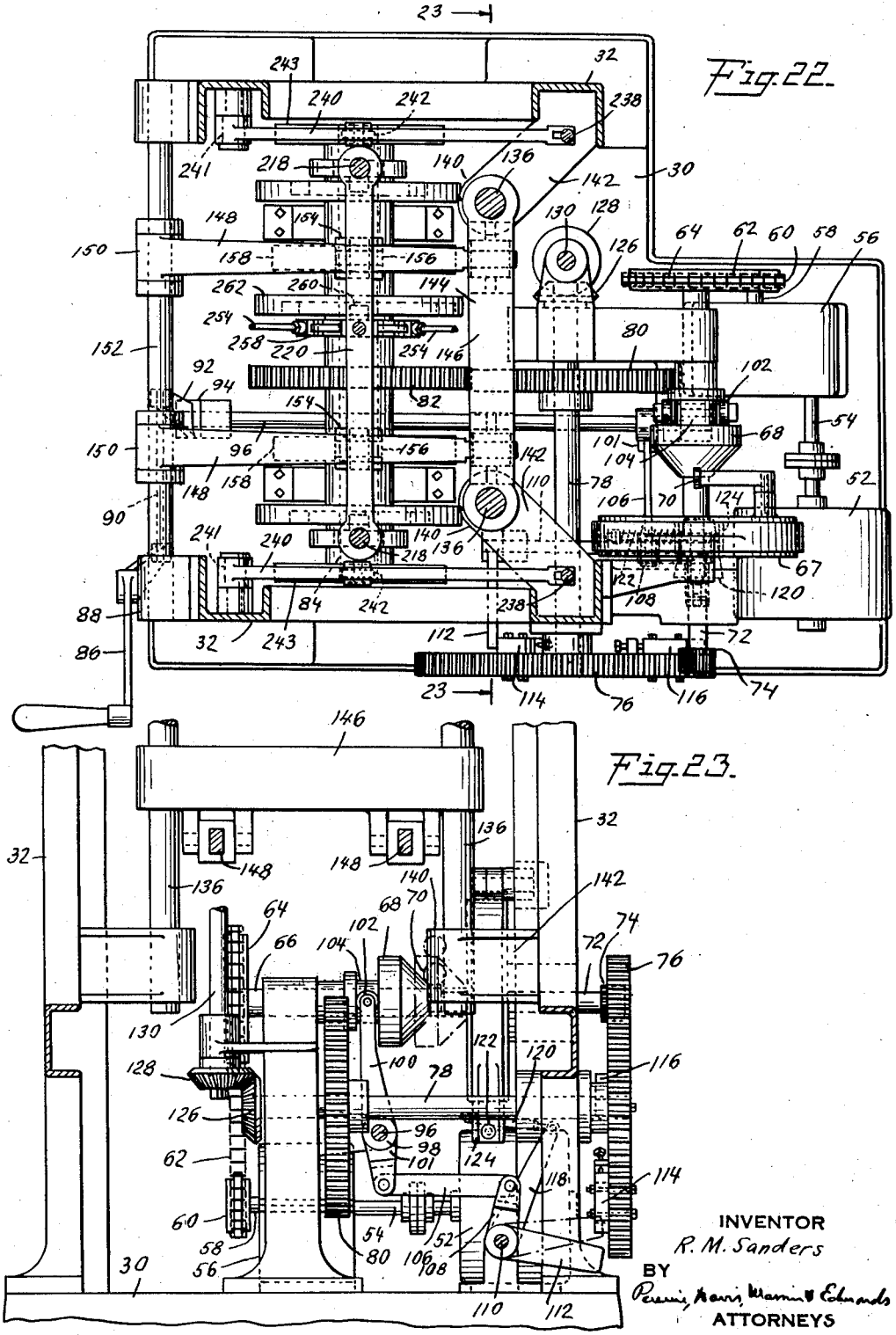

Nov. 27, 1934.   R. M. SANDERS   1,982,454
ASSEMBLING MACHINE
Filed Aug. 22, 1931   10 Sheets-Sheet 8
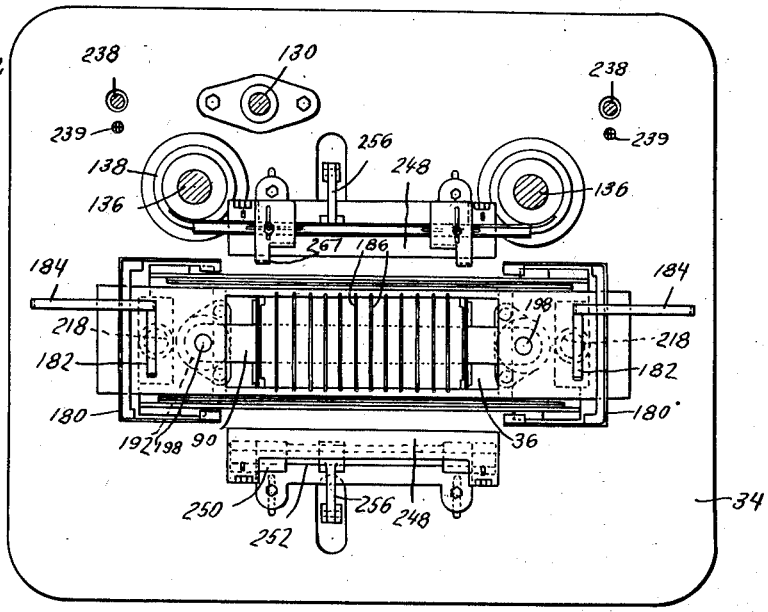
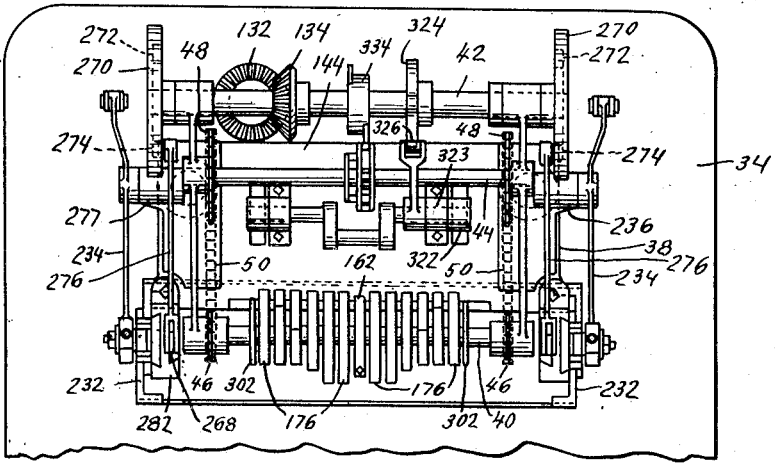
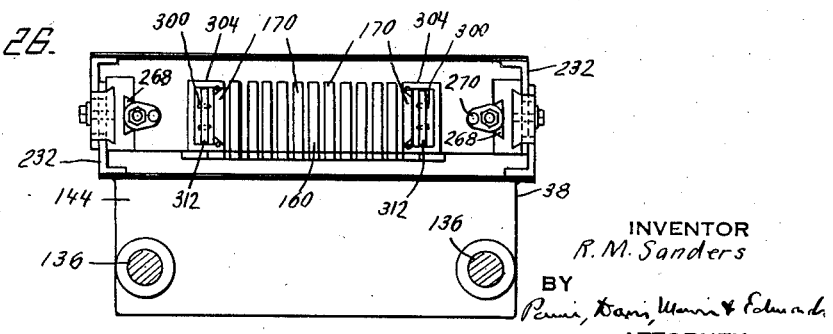
INVENTOR
R. M. Sanders Nov. 27, 1934.    R. M. SANDERS    1,982,454
ASSEMBLING MACHINE
Filed Aug. 22, 1931    10 Sheets-Sheet 9
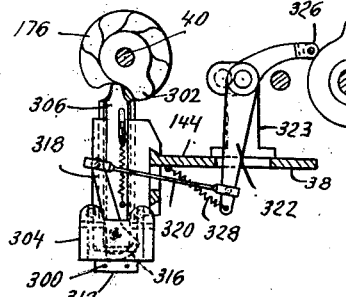
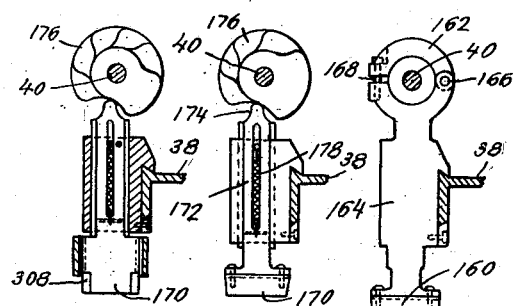
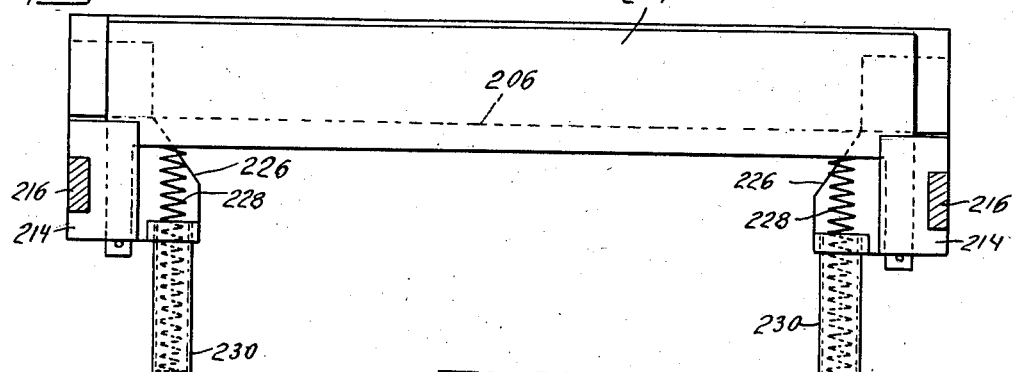
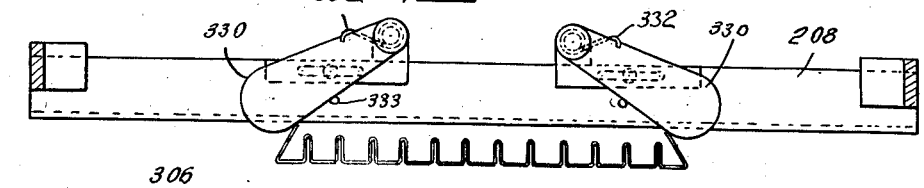
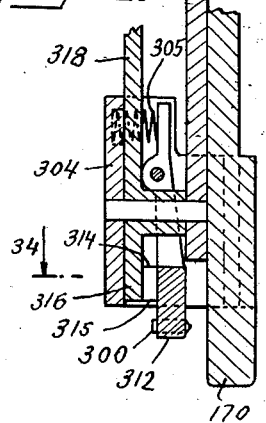
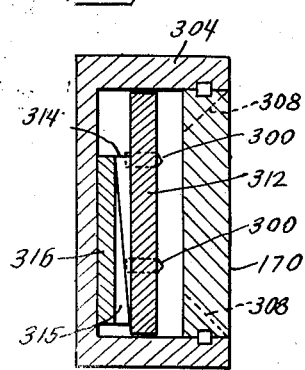
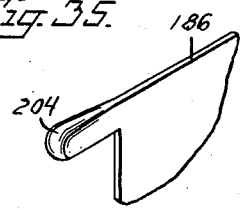
INVENTOR
R. M. Sanders
BY
Pennie, Davis, Marvin & Edmonds
ATTORNEYS Patented Nov. 27, 1934

1,982,454

UNITED STATES PATENT OFFICE 1,982,454

ASSEMBLING MACHINE

Rudolph M. Sanders, New York, N. Y., assignor to Adartcraft, Inc., New York, N. Y., a corporation of Delaware Application August 22, 1931, Serial No. 558,753

34 Claims. (Cl. 93—1)

This invention relates to assembling machines and more particularly to machines for assembling a display device on a back or support.

In the accompanying drawings I have illustrated the invention in connection with a display device for cigars, such as is described and claimed in my copending application Serial No. 460,931, filed June 13, 1930, but the invention is not limited to that particular use and by suitable modifications of various details of the apparatus it may be adapted for other uses.

In the said application there is disclosed and claimed a display device consisting of a plurality of embossings representing cigars, a support, and a covering of Cellophane or similar transparent material to simulate the individually wrapped cigars which are now sold on a large scale. The machine of the present invention comprises means for assembling a sheet of Cellophane and the embossed mat and means for mounting them on a back or support. The invention further comprises various combinations of parts and mechanical movements by means of which these operations are carried out.

In the machine I provide a stage or support on which the articles to be assembled are adapted to be arranged. Over the stage I provide a movable head having gathering fingers equal in number to the number of embossings in the mat. As described in my prior application referred to above, the mat is originally formed of a plurality of spaced embossings separated from each other by unembossed portions which are adapted to be folded to dispose the embossed portions of the mat adjacent each other. In the operation of the machine the sheet of Cellophane or other transparent material and the mat are first arranged on the support or stage and the machine then operated through the first cycle. At the beginning of this cycle the head is lowered and through suitable drive mechanism the gathering fingers are consecutively lowered to fold the mat over a series of separators arranged on the stage. The first gathering finger is brought into operative position when the head is lowered and engages the center embossing of the mat to properly position the mat. The remaining gathering fingers are then lowered by cams in pairs outwardly from the center to each end of the mat. At the end of this operation the head is raised and the back or support placed in position. The head then lowers during the second cycle with all of the gathering fingers in their lowered positions so that they engage the back and force it on to the assembled mat and Cellophane, causing the folded portions between the individual embossings of the mat to be received in the slots in the back.

In the accompanying drawings I have shown one embodiment of the invention. In this showing, Fig. 1 is a perspective view of a portion of a sheet of Cellophane or other transparent material used in the display device;

Fig. 2 is a similar view of the mat;

Fig. 3 is a similar view of the back showing it in inverted position in the position in which it is placed in the machine;

Fig. 4 is a similar view showing the mat secured to the back also in inverted position;

Fig. 5 is a similar view of the assembled display device in normal position;

Fig. 6 is a perspective view of a cigar box showing the display device in position;

Fig. 7 is a front elevation of a portion of the machine, parts being shown in section, showing the position of the parts when the head is lowered in the first operation;

Fig. 8 is a diagrammatic view of a portion of the stage and movable head showing the position of one of the gathering fingers at the end of its movement in the first cycle;

Fig. 9 is a plan view of a portion of one end of the mat and Cellophane covering showing the arrangement of the parts at the end of the operation shown in Fig. 8;

Fig. 10 is an end view of the parts shown in Fig. 9;

Fig. 11 is a view similar to Fig. 8 showing the next step of the first cycle in which creaser bars have engaged the Cellophane projecting beyond the ends of the individual cigar representations to flatten the loops of Cellophane and fold them to simulate the ends of individually wrapped cigars;

Fig. 12 is a plan view of a portion of the mat and Cellophane showing the condition of the Cellophane at the end of the operation shown in Fig. 11;

Fig. 13 is an end view thereof;

Fig. 14 is a view similar to Figs. 8 and 11 showing the next step in the first cycle with the folder bars retaining the Cellophane folded over the mat, and showing the back placed in position for the second cycle;

Fig. 15 is a similar view showing the movable head in lowered position during the second cycle and showing the mat and back assembled;

Fig. 16 is a detailed, sectional view showing the means for moving the separators out of the spaces between the individual cigar representations of the mat as the head lowers and the back is assembled with the mat;

Fig. 17 is a detailed, sectional view on an enlarged scale showing the gathering finger at one end of the head in its lowered position during the first cycle when the Cellophane sheet and mat are being assembled;

Fig. 18 is a similar view showing the gathering finger in the same position during the second cycle when the back is being assembled and showing the crimping means in operative position;

Fig. 19 is a front elevation of the machine, parts being omitted for clarity;

Fig. 20 is an end elevation;

Fig. 21 is a detailed view of the actuating means for moving the spacers, parts being shown in section;

Fig. 22 is a horizontal, sectional view on line 22—22 of Fig. 20;

Fig. 23 is a vertical, sectional view on line 23—23 of Fig. 22;

Fig. 24 is a horizontal, sectional view on line 24—24 of Fig. 19;

Fig. 25 is a plan view of the machine;

Fig. 26 is a bottom plan view of the movable head;

Fig. 27 is a detailed view of the crimper actuating mechanism;

Fig. 28 is a similar view of the center gathering finger;

Fig. 29 is a similar view of one of the other gathering fingers;

Fig. 30 is a similar view of the crimping mechanism;

Fig. 31 is a detailed view of the lower creaser bars;

Fig. 32 is a similar view of the upper creaser bar showing means for retaining the ends of the Cellophane in partially assembled position;

Fig. 33 is a detailed, sectional view of the crimping mechanism;

Fig. 34 is a sectional view on line 34—34 of Fig. 33;

Fig. 35 is a detailed, perspective view of one end of one of the separators on the stage or support showing means for looping the ends of the Cellophane;

Fig. 36 is a detailed view of the drive mechanism for the upper cam shaft carried by the movable head showing the position of the parts at the beginning of the first cycle;

Fig. 37 is a similar view showing the position of the parts when the gathering fingers have been lowered;

Fig. 38 is a similar view showing the position of the parts at the beginning of the second cycle when the crimping mechanism is lowered to its operative position; and Fig. 39 is a plan view of the special gearing or drive shown in Figs. 36 to 38.

Referring to Figs. 1 to 6 of the drawings, the reference numeral 1 designates a sheet of Cellophane or other transparent material adapted to be assembled with the embossed mat and back to produce a product of the type shown in my prior application referred to above. In its original form, after embossing, the mat consists of a plurality of individually spaced embossings 2 simulating cigars. The normally exposed portions of cigar bands may be mounted on the mats in any suitable manner as indicated at 3, or the representations of the bands may be formed during the embossing. The individual embossings are separated from each other by unembossed portions 4 of the mat and these unembossed portions are adapted to be folded along the scored line 5 and along line 6 at each side of the individual embossings 2 and folded beneath the mat so that the individual embossings are arranged closely adjacent each other as shown in Figs. 5 and 6 and simulate a row of cigars arranged in a box.

The embossed mat is adapted to be assembled on a back shown in Fig. 3 of the drawings. As shown, the main or central portion 7 of the back is slightly raised by folding the back along the lines 8 and 9 to produce a vertical wall 10. Spaced slots 11 are formed in the raised portion of the back and extend partially down the vertical walls 10 as shown in Fig. 3 of the drawings. The body of the back extends beyond this raised portion as indicated at 12 and adjacent each side the back is scored on the line 13 to provide flanges 14 which may be folded downwardly from the back to engage the bottom of a cigar box when the back is in assembled position. A reinforcing member 15 is arranged at each end of the back and is secured to the side portions 12 thereof by any suitable means, as by riveting or crimping as indicated at 16. This reinforcing member is provided with a flange 17 extending along the inside of the end wall of the raised portion of the back and is provided with a similar flange 18 on the opposite side of this wall. When the mat is assembled on the back as shown in Fig. 4 of the drawings, the metal reinforcing is crimped as indicated at 19 to securely retain the mat in position. The flange 18 of the reinforcing is provided with a pair of spaced points 20 which may be adjusted to form a snug engagement with the side walls of a cigar box and prevent accidental displacement of the mat if the cigar box is inverted when the mat is in position in the box. The assembled mat and back are shown in Fig. 5 of the drawings and in Fig. 6 I have shown the mat and back arranged in a cigar box 21 in the position normally occupied by the top row or layer of cigars in a full box. It will be apparent that the mat arranged in the box in this manner may be used for display purposes.

Sequence of Operations

First cycle

In assembling the display device by means of the apparatus of the present invention the sheet of Cellophane 1 and the embossed mat shown in Fig. 2 of the drawings are arranged on the stage of the machine and the machine actuated by the operator to lower the movable head arranged over the stage. As stated, the head is provided with a plurality of gathering fingers and the gathering finger 160 shown in Fig. 28 of the drawings is mounted in such position that it will be immediately brought into operation upon the lowering of the head as illustrated in Fig. 7 of the drawings. The remaining gathering fingers are then successively lowered in pairs, the gathering finger on each side of the center descending, etc., until all of the embossed portions 2 of the mat are folded and the Cellophane arranged in the creases between the individual embossings. Suitable spacers are carried on the stage or support to properly position the individual embossings. At the end of the gathering operation, creaser bars at the front and back of the stage engage the loops of Cellophane projecting beyond the ends of the individual embossings and flatten them. The Cellophane is then engaged by reciprocating folder bars and folded over the mat.

Second cycle

At the beginning of the second cycle the back is placed on the stage over the folded mat and Cellophane and the head lowered. The cams which actuate the gathering members during the first cycle are so shaped that the gathering members are lowered together in the second cycle and the back forced over the mat with the folded portions received in the slots 11. At the end of this cycle the metal reinforcements on the ends of the back are crimped as indicated at 19 in Fig. 4 of the drawings.

Description of drawings

Referring to Figs. 19 to 23 of the drawings, the machine comprises a bed 30 having upright posts or standards 32 at each corner thereof and adapted to support a table 34. A stage or work support 36 is mounted on the table and a movable head 38 is supported over the stage. The movable head is provided with a cam shaft 40 driven from an upper drive shaft 42 by means of an intermediate drive shaft 44. The cam shaft 40 and the intermediate shaft 44 are provided with sprockets 46 and 48, respectively, adapted to receive chains 50. The intermediate shaft 44 is driven from the upper drive shaft 42 by means of special drive mechanism shown in Figs. 36 to 39 of the drawings and adapted to produce the proper timing for the upper cam shaft 40. The operation of this drive mechanism will be described in detail hereinafter.

Figure 36:
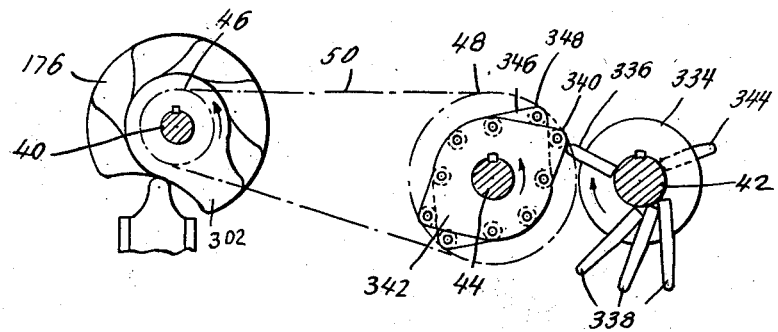

On the base of the machine there is provided a motor 52 having a drive shaft 54 connected to suitable reduction gearing arranged in a gear casing 56. A shaft 58 extends from the gear casing and is provided with a sprocket 60 which is adapted to receive a chain 62 passing over a sprocket 64 on a clutch shaft 66. The clutch shaft is thus continually rotated when the motor 52 is energized. Clutch shaft 66 carries one element of a clutch 67 adapted to cooperate with an element carried on the driven end 72 of the clutch shaft. The clutch 67 is controlled by a lever 70, actuated by a cone 68 slidably mounted on shaft 66. The driven element of the clutch shaft is provided with a pinion 74 (see Fig. 20) adapted to engage a gear 76 on a drive shaft 78. This shaft is in turn provided with a gear 80 meshing with a gear 82 on the lower cam shaft 84. The clutch 67 is adapted to be actuated by an operating handle 86 arranged on the front of the machine and pivoted on a bracket 88 carried by one of the standards 32. The lower end of this operating lever is connected to a link 90 which is in turn connected to an arm 92 carried by a sleeve 94 on a rock shaft 96. The other end of this rock shaft is provided with a sleeve 98 carrying an arm 100 and this arm is provided with a yoke 102 adapted to be received in a groove 104 on the movable cone 68. An arm 101 is also connected to rock shaft 96. This arm is connected to a link 106. The other end of this link is connected to an arm 108 which is secured to a rock shaft 110. A second arm 112 is secured to rock shaft 110 and extends toward the drive gear 76. This gear is provided with a pair of contact members or abutments 114 and 116 which are adapted to engage the arm 112 of the bell crank lever as the gear revolves to depress it and release the clutch 67. The rock shaft 110 also carries an arm 118 having a wedge-shaped member 120 connected to its upper end. This wedge-shaped member is received between ears 124 carried at the ends of a brake band forming a part of clutch 67, and movement of rod 118 by rock shaft 110 releases the brake band at the same time the cone 68 causes engagement of the clutch. The brake band is urged toward its operative position by a spring 122, carried by a rod passing through the ears 124.

Drive shaft 78 is provided with a bevel gear 126 on the end opposite gear 76 and this bevel gear meshes with a second bevel gear 128 carried on a lower end of a vertically extended shaft 130. The upper end of this shaft carries a bevel gear 132 meshing with a bevel gear 134 on the upper drive shaft 42 to drive the upper shaft.

Movable head 38 is carried by a pair of movable, vertical rods 136 mounted in suitable bearings 138 on the bed of the machine and bearings 140 carried by the rear standards 32. As shown in Fig. 22 of the drawings, these lower bearings are secured to the standards by arms or brackets 142. The movable head is connected to the upper ends of these rods by suitable castings 144 (see Fig. 20). Adjacent their lower ends, the rods 136 are connected by a cross bar 146 forming a yoke. A pair of links 148 are connected to this yoke and these links are provided with sleeves 150 on their forward ends surrounding a rod or shaft 152 at the front end of the machine whereby the links are pivotally mounted. These links are provided with enlargements 154 intermediate their ends forming journals for rollers 156 and these rollers contact with cams 158 carried by the lower cam shaft 84. The cams are provided with two high points and two dwells so that the movable head will be raised and lowered twice for each revolution of the cam shaft.

Gathering fingers

The head is provided with a number of gathering fingers equal to the number of individual embossings formed on each mat and adapted to properly assemble the embossed mat and the covering of Cellophane or other transparent material. As shown in Figs. 7 and 19 of the drawings, the center gathering finger 160 is always in projected position. This gathering finger is mounted on the upper cam shaft 40 by means of a split sleeve 162 as shown in Fig. 28 of the drawings. The upper half of the sleeve is pivoted to the shank 164 of the gathering finger, which carries the lower half of the sleeve, as indicated at 166 and the two halves of the sleeve are secured to each other by means of a bolt or threaded stud 168. The sleeve surrounding the cam shaft also acts as a brake for the cam shaft. On each side of the central gathering finger 160 I provide six gathering fingers 170, the detailed construction of one of which is shown in Fig. 29 of the drawings. These fingers are slidably mounted in the head and are each provided with a shank 172 having a contact 174 at its upper end adapted to be engaged by its cam 176. The cams 176 are mounted on the upper cam shaft 40 as shown and are so designed that the pair of gathering fingers on each side of the central gathering finger 160 will be lowered just after the head reaches its lowest position in the first cycle and each succeeding pair of gathering fingers will then be successively lowered. The cams are further designed with concentric portions whereby all of the gathering fingers will remain in their lowered position when the head is lowered during the second cycle of operation. A spring 178 is arranged in a slot in the shank of each of the gathering fingers 170 and is connected to the gathering finger and to the frame of the head to normally retain the gathering finger in a raised or inoperative position.

Details of first cycle of operation

At the beginning of the operation the sheet of Cellophane 1 is laid on the stage or support 36 in the position indicated in Fig. 7 of the drawings and the mat is then placed in position as indicated. Suitable guides 180 are arranged on each side of the stage to properly position the Cellophane sheet. Above the level of the stage I provide guides 182 supported by arms 184 to properly position the mat. By moving the operating lever 86 to the left in Fig. 19 of the drawings, the clutch 68—70 (see Figs. 22 and 23) is engaged causing the rollers 156 to ride off the high points of cams 158 and lower the head to the position shown in Fig. 7. As the head lowers the center gathering finger 160 engages the center embossing 2 and forces it into position between the central pair of spacing members 186. These spacing members extend through slots 188 in the stage or support and are carried on a supporting plate 190 arranged between the stage and the table (see Fig. 16). As shown, the plate 190 is provided with bearings 192 at each side adapted to receive supporting studs or posts 194 carried by the bed. These posts are surrounded by springs 196 which normally retain the plate 190 in a raised position with the spacers 186 projecting through the slots in the stage. The rods 194 are provided with extensions 198 extending above the plate in alignment with openings in the stage and these rods are slidably mounted in the table so that they may be moved downwardly against the tension of springs 196, thus lowering the table and withdrawing the spacers from their operative positions.

In Fig. 8 of the drawings the position of one of the gathering fingers is shown when it has been lowered and has folded one of the embossed portions 2 of the mat into the space between a pair of spacers 186 and also folded the unembossed portion over the upper edge of the spacer along the scored line 5. The width of the Cellophane sheet is greater than the length of the individual embossings 2 so that a portion of the sheet projects beyond each end of the individual cigar representations as indicated at 200 in Fig. 9 of the drawings. The Cellophane is folded into the space between the embossed portions and the excess Cellophane at each end of the individual embossings is formed in loops as indicated at 202 in Figs. 9 and 10 of the drawings. This looping of the Cellophane is facilitated by forming the spacers with rounded enlarged ends 204 as shown in Fig. 35 of the drawings. At the end of the first operation, after all of the gathering fingers have been lowered to fold the mat and Cellophane, the loops 202 are flattened by creaser bars and the excess Cellophane folded over the mat so that when the mat is reversed in normal position this excess Cellophane is under the mat and will show in the spaces between the ends of the individual cigar representations and create an illusion of individually wrapped cigars. The creasing operation is illustrated in Figs. 11 to 13 of the drawings. As shown, I provide a pair of lower creaser bars 204 and 206 at the front and back of the stage and I also provide an upper creaser bar 208 in alignment with the lower creaser bar 204. These creaser bars may be provided with heating coils 210 to heat the Cellophane and facilitate creasing. While the head is in its lowered position the lower creaser bars move upwardly and the upper creaser bars move downwardly from the position shown in Fig. 8 of the drawings to the position shown in Fig. 11 of the drawings. When the creaser bars 204 and 208 engage each other as shown in Fig. 11, further movement of creaser bar 204 is prevented, but the other lower creaser bar 206 continues to move upwardly to the dotted line position shown and folds the Cellophane against the face of the upper creaser bar and irons it flat. This flattening of the loops is illustrated in Figs. 12 and 13 wherein the flattened loops are designated by the reference numeral 212.

The lower creaser bars are carried by frames 214 (see Fig. 20). These frames are connected by end members 216 (see Fig. 19) which are slidably mounted on each end of the stage. The frames are connected to vertically movable rods 218 extending beneath the table and connected to each other by a cross bar 220. The lower portions of rods 218 are provided with turn buckles 217 to permit adjustment and are connected to yokes 219, surrounding the lower cam shaft 84. These yokes are provided with pins 222, which engage cam grooves formed in cams 224 on the lower cam shaft 84 and reciprocate the lower creaser bars at the proper time in the cycle of operations. To permit the continued movement of the creaser bar 206 and provide means for arresting the movement of the creaser bar 204 when it engages the upper creaser bar, I provide a spring support for the creaser bar 204 shown in Fig. 31 of the drawings. As shown, this creaser bar is provided with arms 226 extending into guides in the frame 214 and it is supported on springs 228 having their lower ends secured in sockets 230 on the frame. During the continued upward movement of creaser bar 206, heretofore described, the frames 214 also move but the creaser bar 204 is restrained from movement by its engagement with creaser bar 208 and the springs 228 are consequently placed under compression. At the end of the operation when the creaser bars return to their lower position shown in Fig. 8 of the drawings, the springs 228 are released from compression and the creaser bars 204 assume their normal position beside the creaser bars 206.

The upper creaser bars are likewise carried by a frame 232 slidably mounted on the head (see Fig. 20). The upper creaser bar frame is actuated by arms 234 on each end of the head. These arms are pivotally mounted in suitable brackets carried by the casting 144 of the upper head as indicated at 236. The rear ends of the arms 234 are connected to vertical rods 238 by means of which the frame is reciprocated. The creaser bars are normally retained in inoperative position by a spring 239 connected to the bed of the machine and to the arm 234 as shown in Fig. 20 of the drawings. The rods 238 extend beneath the bed of the machine and are connected to links 240 pivoted at their other ends to the front standards of the machine as indicated at 241. Intermediate their ends these links carry rollers 242, which engage suitable cams 243 on the cam shaft 84 to reciprocate the upper creaser bars.

At the end of the creasing operation and during the upward movement of the head the flattened Cellophane loops 212 shown in Figs. 12 and 13 of the drawings are folded over the mat as indicated by the reference numeral 246 in Fig. 14 of the drawings. This operation is performed by folder bars 248 shown in their inactive or normal position in Fig. 20 of the drawings and shown in their operative position in Fig. 14 of the drawings. The folder bars are carried by frames 250 pivotally mounted on rods 252 at the front and back of the stage and connected to arms 254 of a yoke by links 256. As shown, the arms 254 extend beneath the table toward the main cam shaft 84 and the lower ends of the arms are connected to the head 258 of a yoke which carries a pin 260 (see Fig. 19) operating in a cam groove of a cam 262 mounted on a cam shaft 84. These rods may be provided with telescopic portions 264 (see Figs. 19 and 20) having springs 266 arranged therein to cushion the movement of the folder bars.

*Details of second cycle of operations*

As the head moves upwardly at the end of the first cycle, one of the contact members 114 engages arm 112 to release clutch 68—70 and the operator places a back on the stage over the assembled Cellophane and mat for the beginning of the second cycle of operation. A suitable guide 267 (as shown in Fig. 11) may be arranged at the back of the stage to properly position the back. As stated above, the cams 176 on the upper cam shaft are so shaped that the gathering fingers will all be in their projected position when the head is lowered in the second operation and these gathering fingers engage the back and force it toward the head to the position shown in Fig. 15 of the drawings, the folded unembossed portions 4 of the mat entering the slots 11 in the back. During this operation the spacers 186 are removed just prior to the assemblage of the back and the mat. As shown in Fig. 16 of the drawings, a slide 268 carries a pin 270 adapted to enter the opening in the table and engage the upper end 198 of the rod 194 which carries the table 190. The table is thus lowered and the spacing members 186 withdrawn. The slide 268 is lowered by a cam 271 (see Figs. 20 and 21) carried by the upper drive shaft 42 and having a cam groove 272 formed therein. A roller 274 rides in this groove and this roller is carried by a bell crank lever 276 which is pivotally mounted in the bracket 277 on the casting 144 of the head as indicated at 278. The other arm of the bell crank lever is connected to slide 268 by a link 280 and the slide operates in a suitable guide 282 formed on the head.

Figs. 17 and 18 illustrate one of the gathering fingers 170 on an enlarged scale, Fig. 17 illustrating the folded mat and Cellophane at the end of the first cycle of operations and Fig. 18 illustrating the mat assembled with the other parts at the end of the second cycle of operations, but just prior to the crimping operation. The crimping device 300 is illustrated in position to crimp the reinforcement 15 as indicated at 19 in Fig. 4 of the drawings.

The crimping device is shown in detail in Figs. 27, 30, 33 and 34 of the drawings. One is mounted on each end of the movable head and is capable of movement with respect to the head. During the first cycle of operation the crimping device is retained in a raised position, but it is adapted to be lowered by a cam 302 during the second cycle of operation to be in position to crimp the metal reinforcing. As shown in Fig. 34 of the drawings, it comprises a channel shaped frame 304 carried by a shank 306 similar to the shanks 172 of the gathering fingers, and operated from the upper cam shaft 40, as shown in Fig. 27. The adjacent gathering finger 170 is cut away as indicated at 308 to receive the portions 310 (see Fig. 4) of the reinforcement. The crimping pins 300 are carried by a member 312 pivoted in the frame 304, and normally retained in an inactive position by a spring 305. As shown, a wedge-shaped plate 314 is mounted in the frame 304 on the back of the plate 312. A second wedge-shaped plate 315 is carried by an actuating lever 316. The crimping device is actuated by transverse movement of the lever 316. This lever 316 is pivotally mounted in the frame 304 and is provided with an arm 318 connected to a link 320 which is in turn connected to an operating lever 322 (see Fig. 27) pivotally mounted on a bracket 323. A cam 324 is mounted on the upper drive shaft 42 and is adapted to engage a roller 326 carried by the lever 322 upon each operation of the upper drive shaft to actuate the crimping mechanism. The crimping mechanism is normally retained in inoperative position by a spring 328 connected to the lever 322 and to the frame of the movable head.

After the Cellophane and mat have been folded I provide means to retain the ends in folded position until the back is assembled with them and the crimping operation performed. As shown in Fig. 32 of the drawings, the upper creaser bar 208 is provided with coaxers 330 which are pivotally mounted thereon and which are normally spring pressed by a spring 332 to operative position. Suitable stops 333, limit the movement of the coaxers 332.

*Upper cam shaft drive*

Figure 37:
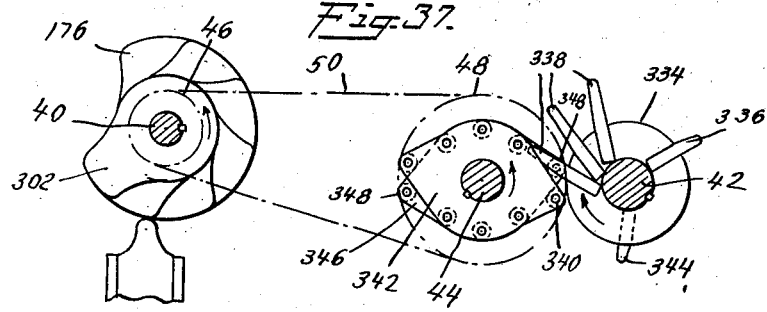
Figure 38:
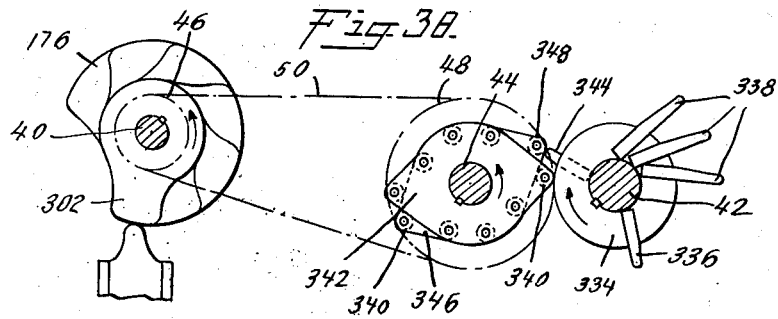
Figure 39:
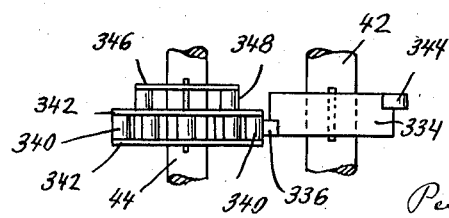

As stated above, the intermediate shaft 44 is driven from the upper drive shaft 42 by the special drive mechanism shown in Figs. 36 to 39 of the drawings and the upper cam shaft 40 is driven from the intermediate shaft by the chain 50. The intermediate shaft is driven at a 1:2 ratio with respect to the drive shaft 42 and drives the upper cam shaft at a 2:1 ratio so that the upper cam shaft makes one complete revolution for each revolution of the upper drive shaft. However, while the two shafts make a single revolution in the same period of time, special timing is necessary for the upper cam shaft as it is not driven at a uniform rate of speed. The upper drive shaft is provided with a hub 334 having a series of radial arms or pins arranged in one vertical plane and having a separate pin arranged in a second vertical plane. As shown, I provide a pin 336 and spaced from this pin I provide a series of three pins 338 uniformly spaced from each other. These pins are adapted to engage transverse pins 340 mounted between plates 342 on shaft 44. As shown eight of the pins 340 are provided and the four pins 336 and 338 will engage four of the pins 340 during each revolution of the drive shaft 42 and thus cause a one-half revolution of the intermediate shaft 44. Pin 344 also projects radially from the hub or disc 334 but in a different plane from the pins 336 and 338 as shown in Fig. 39 of the drawings. A plate 346 is spaced from the adjacent plate 342 and pins 348 are arranged between the plate 346 and the adjacent plate 342. Upon each revolution of the upper drive shaft 42 one of the pins 348 is adapted to be engaged by the pin 344. The two cycles of operation of the machine are indicated in Figs. 36 to 38 of the drawings. At the beginning of the first cycle the parts are in the position shown in Fig. 36 of the drawings and the pin 336 is about to ride over one of the transverse pins 340. During the period of rotation of the drive shaft 42 from the pin 336 to the first of the pins 338 the upper cam shaft is idle and the entire head is being lowered by the mechanism heretofore described. As the three pins 338 successively engage one of the pins 340 the cam shaft is rotated and the various cams 176 successively force down the shanks of the gathering fingers and thus project the gathering fingers to their operative positions. This completion of the first cycle of operation is indicated in Fig. 37 of the drawings. During the early part of the second cycle of operation the cam shaft is again idle while the head is being lowered to assemble the mat and back, but toward the end of this cycle pin 344 engages one of the pins 348 to move it from the position shown in Fig. 37 of the drawings to the position shown in Fig. 38 of the drawings and further rotate the cam shaft. This further rotation of the cam shaft moves the crimper cams 302 a sufficient distance to lower the crimpers to their operative position just prior to the engagement of the roller 326 with the cam 324 (see Fig. 27) when the crimping operation is performed.

The operation of the device will be apparent from the foregoing description. At the beginning of the operation a sheet of Cellophane 1 and a mat is placed on the stage in engagement with the guides 180 and 182, respectively, and operating lever 86 is moved to the left in Fig. 19 of the drawings to engage the clutch 68—70 and rotate the drive shaft 78. At the beginning of this operation the rollers 156 ride off the high points of cams 158 and the head lowers to the position shown in Fig. 7 of the drawings. The center gathering finger 160 engages the center embossing 2 of the mat and the parts assume the position shown in Fig. 7. During the downward movement of the head, upper cam shaft 40 is not driven, but the upper drive shaft 42 moves from the point shown in Fig. 36 of the drawings to the point where the first of the pins 338 is about to engage one of the pins 340. As the three pins 338 successively engage one of the pins 340, the intermediate shaft 44 rotates substantially a half a revolution and drives the upper cam shaft 40 through substantially a whole revolution. During this movement of the upper cam shaft the cams 176 successively depress the gathering fingers. The cams are so arranged that the two gathering fingers on each side of the center are first depressed, then the next pair and so on until all of the gathering fingers have been depressed and the cams are also shaped to retain the gathering fingers in the depressed or operative position throughout the second cycle.

As the last of the gathering fingers assume their operative position, the creaser bars 204, 206 and 208 move toward each other, the lower creaser bars being actuated by cams 224 which raise the lower frames 214 and the upper creaser bars being lowered by cams 243 which raise the vertical rods 238 to swing levers 234 on their pivots. The detailed operation of the creaser bars has heretofore been described.

At the end of the creasing operation the folder bars are actuated through the engagement of pin 260 with the cam portion of the groove in cam 262. The rollers 156 then ride on to one of the high points of cams 158 and raise the head. At this point, one of the projections 116 engages arm 112 to disengage the clutch 68—70. In the particular machine described in this application the gear 76 rotates 240° during the first cycle of operations and 120° during the second cycle of operations although this is a detail that may, of course be varied depending upon the work to be done in each cycle of operations.

After the clutch has been disengaged the operator places a back on the stage as shown in Fig. 14 of the drawings and again moves the operating lever 86 to the left. During the major portion of the second cycle the cam shaft 40 does not rotate and the shape of the cams 176 is such that the gathering fingers are all retained projected or in operative position to engage the back at the same time and force it toward the assembled mat and Cellophane so that the unembossed portion 4 of the mat will project through the slots 11 in the back as shown in Fig. 15 of the drawings. During this movement of the back into position with respect to the mat, cam grooves 272 cause the bell crank lever 276 to be swung on its pivot and lowers the slide 268 as shown in Fig. 16 of the drawings to lower the table 190 and withdraw the spacers 186. The groove of the cam is so designed that the spacers will be withdrawn just in advance of the movement of the back into position. When the slide 268 returns to its normal position the spacers are again projected by the springs 196. Toward the end of the second cycle of operations the pin 344 engages one of the transverse pins 348 and moves the upper cam shaft sufficiently to bring the cams 302 in to position to lower the crimping devices at each end of the head to the operative position shown in Fig. 18 of the drawings. After the head has been lowered the cam 324 on the upper drive shaft engages roller 326 on lever 322 to move the plate 316 on its wedge 315 transversely of the plate 312 and its wedge 314. This causes the plate 312 to move toward the gathering finger 170 and perform the crimping operation. Just after the crimping operation has been performed the second projection 114 engages the lever 112 to again disengage the clutch 68—70, completing the two cycles of operation.

I claim:

1. Apparatus of the character described comprising a stage, a movable head mounted over said stage, means for raising and lowering said head, a shaft carried by said head, a plurality of cams mounted on said shaft, and gathering fingers slidably mounted on said head and adapted to be actuated by said cams.

2. Apparatus for assembling display devices comprising a stage, a movable head arranged over said stage, a plurality of gathering fingers mounted to reciprocate on said head and actuating means carried by said head for successively reciprocating said gathering fingers upon each alternate lowering of said head, said fingers remaining stationary upon the second lowering of said head.

3. Apparatus for assembling display devices comprising a stage, a movable head mounted over said stage, means for raising and lowering said head, a plurality of gathering fingers carried by said head, means for successively actuating said gathering fingers, creaser bars arranged adjacent said stage, and means operating in timed relation with the operation of said gathering fingers for reciprocating said creaser bars.

4. Apparatus for assembling display devices comprising a stage, a plurality of spacers mounted on said stage, a movable head arranged over said stage, means for reciprocating said head, gathering fingers carried by said head, drive means for said gathering fingers whereby said fingers are consecutively operated upon each alternate lowering of said head and simultaneously operated upon each alternate lowering of said head, a pair of lower creaser bars and an upper creaser bar arranged in front of and in back of said support, means for reciprocating said creaser bars at the end of the first lowering of said head, folder bars arranged in front of and in back of said support, means for reciprocating said folder bars over said support, crimping means carried on each end of said head, and means for actuating said crimping means.

5. Apparatus for assembling display devices comprising a stage, a movable head arranged over said stage, a shaft carried by said head, a plurality of cams mounted on said shaft, gathering fingers carried by said head and adapted to be reciprocated by certain of said cams, and crimping devices carried by said head and adapted to be lowered to an operative position by certain of said cams.

6. Apparatus of the character described comprising a stage, a movable head mounted over said stage, means for raising and lowering said head, a plurality of gathering fingers carried by said head, means for successively actuating said gathering fingers, folder bars arranged in front of and in back of said stage, and means operating in timed relation with the operation of said gathering fingers for reciprocating said folder bars.

7. Apparatus for assembling display devices comprising a stage, a head mounted over the stage, a cam shaft adjacent said stage, connections between said cam shaft and said head to reciprocate said head toward said stage, gathering fingers mounted on said head, and means carried by the head for reciprocating said gathering fingers.

8. Apparatus for assembling display devices comprising a stage, a head mounted over the stage, a cam shaft adjacent said stage, connections between said cam shaft and said head to reciprocate said head toward said stage, gathering fingers mounted on said head, and means carried by the head for consecutively reciprocating said gathering fingers.

9. Apparatus for assembling display devices comprising a stage, a head mounted over the stage, a cam shaft adjacent said stage, connections between said cam shaft and said head to reciprocate said head toward said stage, gathering fingers mounted on said head, one of said gathering fingers being mounted on said head in the normally projected position of said gathering fingers, and means carried by the head for consecutively projecting the gathering fingers on each side of said first mentioned gathering finger.

10. Apparatus for assembling display devices comprising a stage, a head mounted over said stage, a cam shaft adjacent said stage, connections between said cam shaft and said head to reciprocate said head toward said stage, a shaft carried by said head, a plurality of cams mounted on said shaft, and gathering fingers carried by said head and adapted to be actuated by said cams.

11. Apparatus for assembling display devices comprising a stage, a head mounted over said stage, a cam shaft adjacent said stage, connections between said cam shaft and said head to reciprocate said head toward said stage, a shaft carried by said head, a plurality of cams mounted on said shaft, gathering fingers carried by said head and adapted to be actuated by certain of said cams, and crimping mechanism carried by said head and adapted to be actuated by certain of said cams.

12. Apparatus for assembling display devices comprising a stage having a plurality of spaced slots, a plate arranged beneath said stage, spacers carried by said plate and projecting through said slots, a reciprocating head arranged over said stage, gathering fingers mounted on said head, and means for moving said plate to withdraw said spacers from said slots.

13. Apparatus for assembling display devices comprising a stage, a movable head mounted over said stage, means for raising and lowering said head, a plurality of gathering fingers carried by said head, means for actuating said gathering fingers, creaser bars arranged adjacent said stage, and means operating in timed relation with the operation of said gathering fingers for reciprocating said creaser bars.

14. Apparatus for assembling display devices comprising a stage, a movable head mounted over said stage, means for raising and lowering said head, a plurality of gathering fingers carried by said head, means for actuating said gathering fingers, upper and lower creaser bars arranged adjacent the front and rear of said stage, and means operating in timed relation with the operation of said gathering fingers for reciprocating said creaser bars.

15. Apparatus for assembling display devices comprising a stage, a movable head mounted over said stage, means for raising and lowering said head, a plurality of gathering fingers carried by said head, means for actuating said gathering fingers, upper and lower creaser bars arranged adjacent the front and rear of said stage, a cam shaft, cams arranged on said shaft and connections between said cams and said creaser bars to reciprocate said creaser bars in timed relation to the operation of said second means.

16. Apparatus for assembling display devices comprising a stage, a movable head mounted over said stage, means for raising and lowering said head, a plurality of gathering fingers carried by said head, means for actuating said gathering fingers, a lower creaser bar frame arranged adjacent said stage, an upper creaser bar frame carried by said head, creaser bars carried by said frame, a cam shaft arranged beneath said stage and driven in timed relation to the second means, a set of cams mounted on said shaft and connected to said lower creaser bar frame, a second set of cams mounted on said shaft, and levers connecting said second set of cams to said upper creaser bar frame to reciprocate said upper creaser bar frame.

17. Apparatus in accordance with claim 16 wherein said creaser bars on the lower frame comprise one pair of the bars in front of said stage and a pair of the bars in the rear of said stage, one creaser bar of each pair being adapted to continue to reciprocate after the other has stopped.

18. Apparatus in accordance with claim 16 wherein said creaser bars on the lower frame comprise one pair of the bars in front of said stage and a pair of the bars in the rear of said stage, and one of said creaser bars of each pair is provided with a resilient support.

19. Apparatus in accordance with claim 4 wherein means are provided for retracting said spacers from their operative position.

20. Apparatus in accordance with claim 4 wherein a cam shaft is carried by said head, and cams are provided on said shaft to operate said gathering fingers.

21. Apparatus in accordance with claim 4 wherein cams are provided to reciprocate said creaser bars.

22. Apparatus for assembling display devices comprising a stage, a movable head mounted over said stage, a cam shaft carried by said head, a plurality of cams mounted on said cam shaft, a drive shaft connected to said cam shaft, gathering fingers carried by said head and adapted to be reciprocated by certain of said cams, crimping devices carried by said head and adapted to be lowered to an operative position by certain of said cams, a cam mounted on said drive shaft, and means actuated by said cam to operate said crimping mechanism.

23. Apparatus of the character described comprising a stage, a movable head mounted over said stage, a cam shaft beneath said stage, cams carried by said shaft, connections between said cams and said head to reciprocate said head, a plurality of gathering fingers carried by said head, means for actuating said gathering fingers, folder bars arranged in front of and in back of said stage, cams on said cam shaft to actuate said folder bars, and connections between said last mentioned cams and said folder bars.

24. Apparatus for assembling display devices comprising a stage, a head mounted over said stage, a cam shaft beneath said stage, cams mounted thereon, connections between said cams and said head to reciprocate said head, gathering fingers mounted on said head, means for reciprocating said gathering fingers, folder bar frames pivotally mounted in front of and in the rear of said stage, folder bars carried by said frames, a cam arranged on said cam shaft to actuate said folder bars, and connections between said folder bar frames and said cam.

25. Apparatus for assembling display devices comprising a stage, a head mounted over said stage, a cam shaft beneath the stage, cams mounted on said shaft, connections between said cams and said head to reciprocate said head toward said stage, gathering fingers mounted on said head, means for reciprocating said gathering fingers, a lower creaser bar frame mounted on said stage, an upper creaser bar frame mounted on said head, creaser bars carried by said creaser bar frames, cams mounted on said cam shaft, connections between said cams and said upper creaser bar frame to reciprocate said upper creaser bar frame, additional cams mounted on said cam shaft, and connections between said additional cams and said lower creaser bar frame to reciprocate said lower creaser bar frame.

26. Apparatus for assembling display devices comprising a stage, a head mounted over said stage, a cam shaft arranged adjacent said stage, cams mounted thereon, connections between said cams and said head to reciprocate said head, a second shaft operatively connected to said cam shaft to drive said cam shaft, a clutch controlling the rotation of said second shaft, and means operable by the movement of said second shaft to disengage said clutch at the end of a cycle of movement of said head.

27. Apparatus for assembling display devices comprising a stage having a plurality of spaced slots, a plate arranged beneath said stage, spacers carried by said plate and projecting through said slots, a reciprocating head arranged over said stage, gathering fingers mounted on said head, a spring support for said plate, and means for moving said plate away from said stage to retract said spacers.

28. Apparatus for assembling display devices comprising a stage, a movable head mounted over said stage, means for raising and lowering said head, a cam shaft carried by said head, a plurality of cams mounted on said shaft, and gathering fingers slidably mounted on said head and adapted to be actuated by said cams, said cams being adapted to project said gathering fingers during one cycle of movement of said head and to retain said gathering fingers in projected position during the next cycle of movement of said head.

29. Apparatus in accordance with claim 22 wherein a pivoted lever is mounted on said head and adapted to be engaged by the cam on said drive shaft, said lever being connected to said crimping mechanism to actuate the same.

30. In an apparatus of the character described, a lower creaser bar frame, a pair of creaser bars carried by said frame, springs supporting one of said creaser bars whereby limited relative movement of said creaser bar and said frame is permitted, an upper creaser bar frame, a creaser bar carried by said upper creaser bar frame in alignment with said spring mounted lower creaser bar, and means for reciprocating said creaser bar frames.

31. In an apparatus of the character described, a stage, a head mounted on said stage, gathering fingers mounted on said head, means for reciprocating said gathering fingers, a pivotally mounted folder bar frame, a folder bar carried by said frame, and means for swinging said frame on its pivot in timed relation to the movements of said gathering fingers.

32. Apparatus for folding Cellophane or the like, comprising a support, a plurality of spacers on said support, and gathering members positioned above said support and adapted to move downwardly successively into position between corresponding adjacent spacers, the ends of said spacers extending beyond the ends of said gathering members and being enlarged in cross section to facilitate looping the Cellophane adjacent the edges thereof.

33. Apparatus for folding Cellophane or the like, comprising a support, a plurality of spacers on said support, and gathering members positioned above said support and adapted to move downwardly successively into position between corresponding adjacent spacers, the ends of said spacers extending beyond the ends of said gathering members and being enlarged and rounded in cross section to facilitate looping the Cellophane adjacent the edges thereof.

34. In apparatus of the character described, a movable head, crimping mechanism carried by said head, means for lowering said head, means for lowering said crimping mechanism relatively to said head, and means for actuating said crimping mechanism while in its lowered position.

RUDOLPH M. SANDERS.